(12) United States Patent
Park et al.

(10) Patent No.: US 9,083,030 B2
(45) Date of Patent: Jul. 14, 2015

(54) BATTERY MODULE

(75) Inventors: Shi-Dong Park, Yongin-si (KR); Tae-Yong Kim, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 162 days.

(21) Appl. No.: 13/352,488

(22) Filed: Jan. 18, 2012

(65) Prior Publication Data

US 2013/0052515 A1   Feb. 28, 2013

(30) Foreign Application Priority Data

Aug. 25, 2011   (KR) .......................... 10-2011-0085284

(51) Int. Cl.
  *H01M 2/10*   (2006.01)
  *H01M 2/20*   (2006.01)

(52) U.S. Cl.
  CPC ............ *H01M 2/1077* (2013.01); *H01M 2/206* (2013.01); *H01M 2/10* (2013.01); *H01M 2/20* (2013.01)

(58) Field of Classification Search
  None
  See application file for complete search history.

(56) References Cited

U.S. PATENT DOCUMENTS

| | | | |
|---|---|---|---|
| 6,306,541 B1 | 10/2001 | Dahn et al. | |
| 7,270,576 B2* | 9/2007 | Kim et al. | 439/627 |
| 7,393,608 B2* | 7/2008 | Cho | 429/123 |
| 7,563,137 B1 | 7/2009 | Koetting et al. | |
| 7,713,655 B2 | 5/2010 | Ha et al. | |
| 8,137,845 B2 | 3/2012 | Kim et al. | |
| 2007/0037063 A1 | 2/2007 | Choi et al. | |
| 2008/0020281 A1 | 1/2008 | Kogetsu et al. | |
| 2009/0075173 A1 | 3/2009 | Jeong et al. | |
| 2010/0196752 A1 | 8/2010 | Yue et al. | |
| 2010/0248008 A1* | 9/2010 | Sugawara et al. | 429/159 |
| 2010/0266887 A1 | 10/2010 | Sekino et al. | |
| 2011/0302773 A1 | 12/2011 | Chattot | |
| 2012/0115015 A1* | 5/2012 | Park et al. | 429/159 |

FOREIGN PATENT DOCUMENTS

| | | |
|---|---|---|
| DE | 102006044168 A1 | 3/2008 |
| GB | 905222 | 12/1959 |
| JP | 10-097853 A | 4/1998 |
| JP | 2001-210315 A | 8/2001 |
| JP | 2004-119187 A | 4/2004 |
| JP | 2006-253060 A | 9/2006 |

(Continued)

OTHER PUBLICATIONS

Ephraim (DE 102006044168) (a raw machine translation).*

(Continued)

*Primary Examiner* — Milton I Cano
*Assistant Examiner* — Carmen Lyles-Irving
(74) *Attorney, Agent, or Firm* — Lee & Morse, P.C.

(57) ABSTRACT

There is provided a battery module including a first housing and a second housing, the first housing and the second housing each retaining a plurality of rechargeable batteries electrically connected to each other, the second housing being stacked on the first housing, and at least one of the rechargeable batteries retained by the second housing being coupled with at least one of the rechargeable batteries retained by the first housing; and a connecting member electrically connecting electrode terminals of the at least one rechargeable battery retained by the first housing and the at least one rechargeable battery retained by the second housing.

14 Claims, 6 Drawing Sheets

(56) References Cited

FOREIGN PATENT DOCUMENTS

| | | |
|---|---|---|
| JP | 2007-019027 A | 1/2007 |
| JP | 2008-130560 A | 6/2008 |
| JP | 2009-070825 A | 4/2009 |
| KR | 1998-053600 U | 10/1998 |
| KR | 10-2007-0080871 A | 8/2007 |
| KR | 10-2008-0025428 | 3/2008 |
| KR | 10-2009-0007337 A | 1/2009 |
| KR | 10-2010-0003133 A | 1/2010 |
| KR | 10-2010-0055477 | 5/2010 |
| WO | WO 2010061063 A1 | 6/2010 |
| WO | WO 2011057246 A1 | 5/2011 |

OTHER PUBLICATIONS

European Search Report dated Dec. 19, 2012.

* cited by examiner

BATTERY MODULE

CROSS-REFERENCE TO RELATED APPLICATION

Korean Patent Application No. 10-2011-0085284, filed on Aug. 25, 2011, in the Korean Intellectual Property Office, and entitled: "Battery Module," is incorporated by reference herein in its entirety.

BACKGROUND

1. Field

The described technology relates generally to a battery module.

2. Description of the Related Art

Unlike a primary battery, a rechargeable battery can be repeatedly charged and discharged. A low capacity rechargeable battery has been used for small electronic devices such as a mobile phone, a laptop computer, and a camcorder. A large capacity battery has been used as a power source for driving a motor of a hybrid vehicle.

A high power rechargeable battery using a high energy density non-aqueous electrolyte is a large capacity rechargeable battery formed of a plurality of rechargeable batteries connected in series. The high power rechargeable battery is used for driving a motor for an electric vehicle The rechargeable battery may be formed in a cylindrical shape or a rectangular shape.

A hybrid vehicle and an electric vehicle have a wide area such that battery modules may be arranged in a plane, e.g., side-by-side in a horizontal direction for installation. Compared with these vehicles, a two-wheeled vehicle, such as a motor scooter, has a limited area such that it is necessary to stack and arrange the battery modules in a vertical direction.

The above information disclosed in this Background section is only for enhancement of understanding of the background of the described technology and therefore it may contain information that does not form the prior art that is already known in this country to a person of ordinary skill in the art.

SUMMARY

One or more embodiments may provide a battery module, including: a first housing and a second housing, the first housing and the second housing each retaining a plurality of rechargeable batteries electrically connected to each other, the second housing being stacked on the first housing, and at least one of the rechargeable batteries retained by the second housing being coupled with at least one of the rechargeable batteries retained by the first housing; and a connecting member electrically connecting electrode terminals of the at least one rechargeable battery retained by the first housing and the at least one rechargeable battery retained by the second housing. The at least one rechargeable battery retained by the first housing may be positioned at an end portion of the first housing and may include a first terminal. The at least one rechargeable battery retained by the second housing may be positioned at an end portion of the second housing, corresponding to the position of the at least one rechargeable battery retained by the first housing, and includes a second terminal. The connecting member may connect the first electrode terminal and the second electrode terminal, a position of the second electrode terminal corresponding to a position of first electrode terminal. The connecting member may extend in a direction in which the first housing and the second housing are stacked along an end portion of the second housing.

The at least one rechargeable battery retained by the first housing may be positioned at an end portion of the first housing and may include a first terminal, the at least one rechargeable battery retained by the second housing may be positioned at an end portion of the second housing, may correspond to the position of the at least one rechargeable battery retained by the first housing, and may include a second terminal, the connecting member may include a first connecting member extending outside of the first housing and a second connecting member connected to the first connecting member, the second connecting member may extend along an end portion of the second housing in a direction in which the first housing and the second housing are stacked, and the first connecting member may be connected to the first terminal and the second connecting member is connected to the second terminal.

The first connecting member may include a first protruded portion extending away from the first housing, the first protruded portion including a first connection hole, the second connecting member including a second protruded portion extending away from the second housing, the second protruded portion including a second connection hole, and the first connecting member and the second connecting member may be in alignment and coupled together by a fastening member.

The first housing may have a clamping hole formed therein. The clamping hole of the first housing may be aligned with the first connection hole and the second connection hole, and the fastening member may penetrate the first connection hole and the second connection hole and be retained within the clamping hole.

The first connecting member may have a first terminal connection hole, and the first electrode terminal may extend through the first terminal connection hole and be electrically connected to the first connecting member by a nut threaded thereon.

The second connecting member may have a second terminal connection hole, and the second electrode terminal may extend through the second terminal connection hole and be electrically connected to the second connecting member by a nut threaded thereon.

The first connecting member may have a pair of first terminal connection holes corresponding to a pair of first electrode terminals. The second connecting member may have a pair of second terminal connection holes corresponding to a pair of second electrode terminals.

The first housing and the second housing, respectively, may have a first horizontal flange and a second horizontal flange extending from adjacent sides of the first housing and the second housing in a direction perpendicular to a direction in which the first housing and the second housing are stacked, the first horizontal flange and the second horizontal flange may be facing each other. The first horizontal flange and the second horizontal flange may be secured together by a fastening member that extends in the direction in which the first housing and the second housing are stacked.

The first housing and the second housing, respectively, may have a first vertical flange and a second vertical flange extending from adjacent sides of the first housing and the second housing in a direction in which the first housing and the second housing are stacked, the first vertical flange and the second vertical flange may be facing each other. The first vertical flange and the second vertical flange may be secured together by a fastening member that is inserted in a direction perpendicular to the direction in which the first housing and the second housing are stacked.

The battery module may further include a bus bar connecting the electrode terminals of neighboring rechargeable batteries, and a protection plate under the bus bar, the protection plate having a protrusion extending above an end portion of the electrode terminals above the bus bar. The protection plate may be coupled with the first housing and may support a lower surface of the second housing.

The battery module may further include an electrically insulating protection member at one side of the connecting member, the protection member covering the connecting member. The protection member may include a covering portion corresponding to a position of the connecting member, and a mounting portion protruded from both sides of the covering portion and mounted to the second housing by a fastening member.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
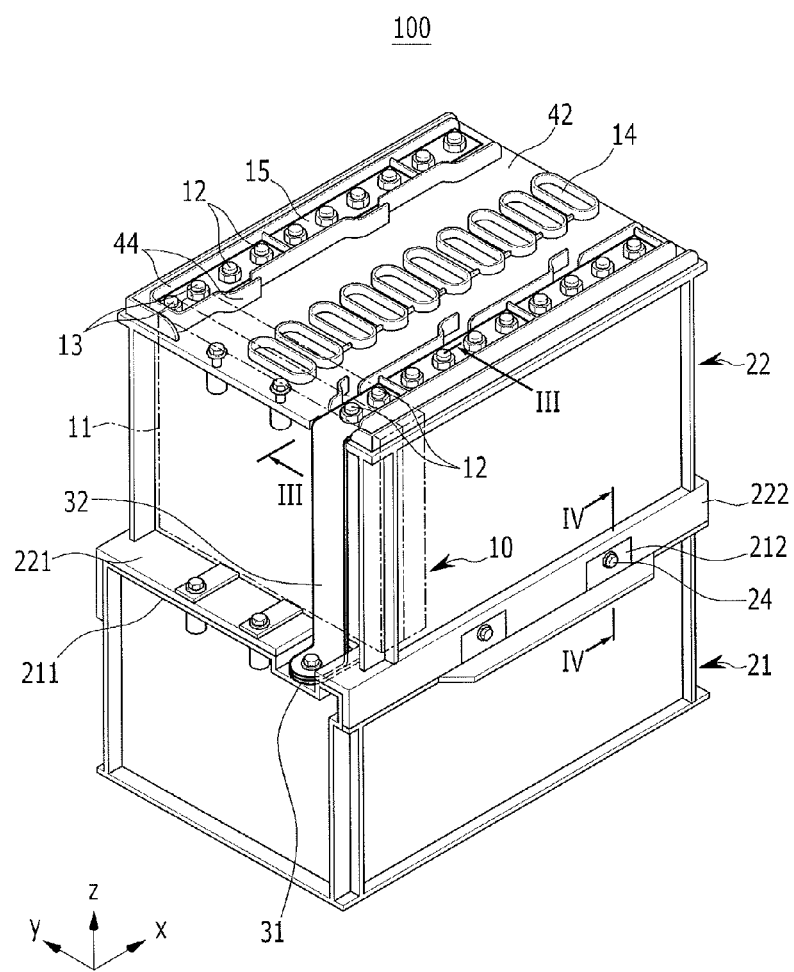
FIG. 1 illustrates a perspective view of a battery module according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "on" another element, it can be directly on the other element, or intervening elements may also be present. Further, it will be understood that when an element is referred to as being "under" another element, it can be directly under, and one or more intervening elements may also be present. Like reference numerals refer to like elements throughout.

Figure 2:
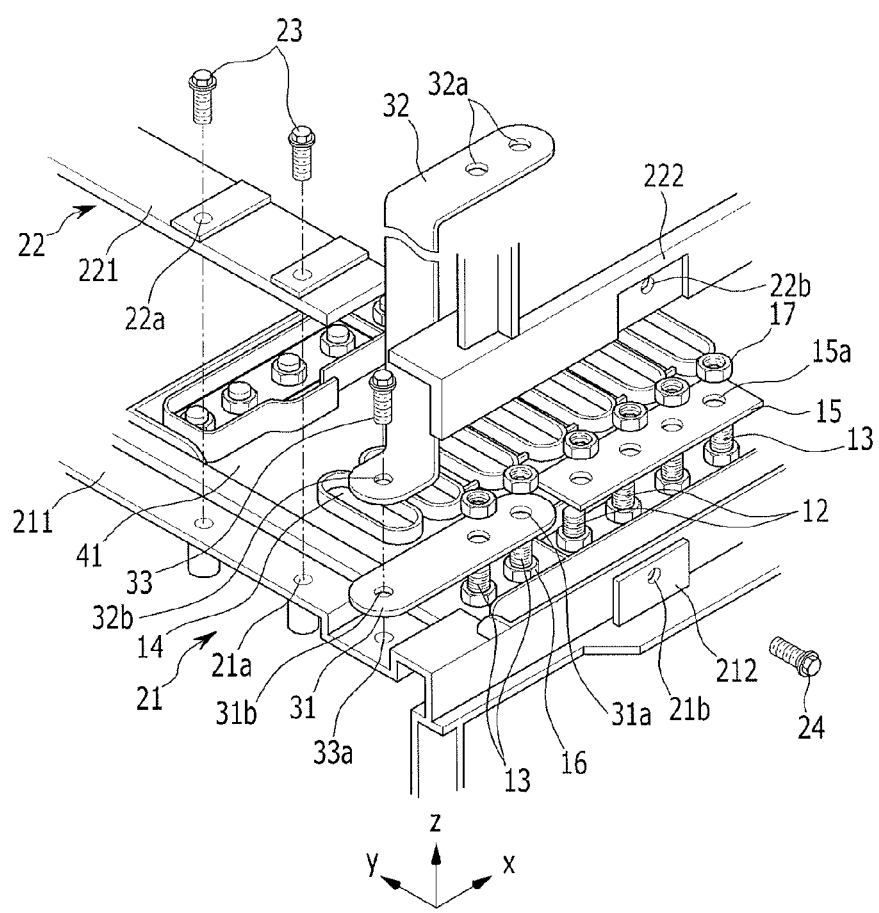
FIG. 2 illustrates an exploded perspective view of a first housing, a second housing, and a connecting member of the battery module illustrated in FIG. 1.

FIG. 1 illustrates a perspective view of a battery module 100 according to a first exemplary embodiment. FIG. 2 illustrates an exploded perspective view of a first housing 21, a second housing 22, and a connecting member of the battery module illustrated in FIG. 1.

Referring to FIG. 1 and FIG. 2, a battery module 100 of the first exemplary embodiment may include the first housing 21, the second housing 22, and a connecting member. The first housing 21 and the second housing 22 may each retain a plurality of rechargeable batteries 10. The connecting member may include a first connecting member 31 and a second connecting member 32. The first connecting member 31 and second connecting member 32 may electrically connect electrode terminals of the rechargeable batteries 10 that are respectively retained in the first and second housings 21 and 22.

According to some embodiments, the rechargeable battery 10 may be a lithium ion secondary battery and may have a prismatic shape. According to some embodiments, the rechargeable battery 10 may be any suitable type of rechargeable battery, such as a lithium polymer battery or a cylindrical battery.

The rechargeable battery 10 may include a case 11 retaining an electrode assembly (not shown), electrode terminals protruding outside the case 11, and a vent plate 14 (that opens in response to a predetermined pressure and emits an inner gas generated under charge and discharge). The electrode terminals may include a positive terminal 12 and a negative terminal 13.

The case 11 may be prismatic, having an approximately rectangular parallelepiped shape. The case 11 may include aluminum or an aluminum alloy. The positive and negative terminals 12 and 13 may be electrically connected to a positive electrode and a negative electrode (not shown) of the electrode assembly, respectively, and may extend above an outer surface of the case, to protrude outside of the rechargeable battery 10.

A plurality of rechargeable batteries 10 may be disposed within the same structure, e.g., in the first and second housings 21 and 22. For example, in the second housing 22, a plurality of rechargeable batteries 10 may be arranged in parallel in an x-axis direction. Each rechargeable battery 10 may include opposing wide front and rear surfaces, which extend between opposing narrow side surfaces. In an implementation, the wide front surface of the rechargeable battery 10 may face the wide rear surface of an adjacent rechargeable battery 10 in the x-axis direction. The narrow side surfaces of adjacent rechargeable batteries 10 may be disposed in parallel and may face top or bottom surfaces of the case 11 in which they are retained.

Among the plurality of rechargeable batteries 10, adjacent rechargeable batteries 10 may be coupled in parallel. A pair of rechargeable batteries 10 that are coupled in parallel and another pair of rechargeable batteries 10 that are coupled in parallel may again be connected in series. For example, a pair of adjacent positive terminals 12 and a pair of adjacent negative terminals 13 may be alternately disposed. The pair of adjacent positive terminals 12 and the pair of adjacent negative terminals 13 may be connected by a bus bar 15. The rechargeable batteries 10 may be coupled in series. In another implementation, three rechargeable batteries may be coupled in parallel. In an implementation, three rechargeable batteries that are coupled in parallel may be coupled in series (not shown).

Figure 3:
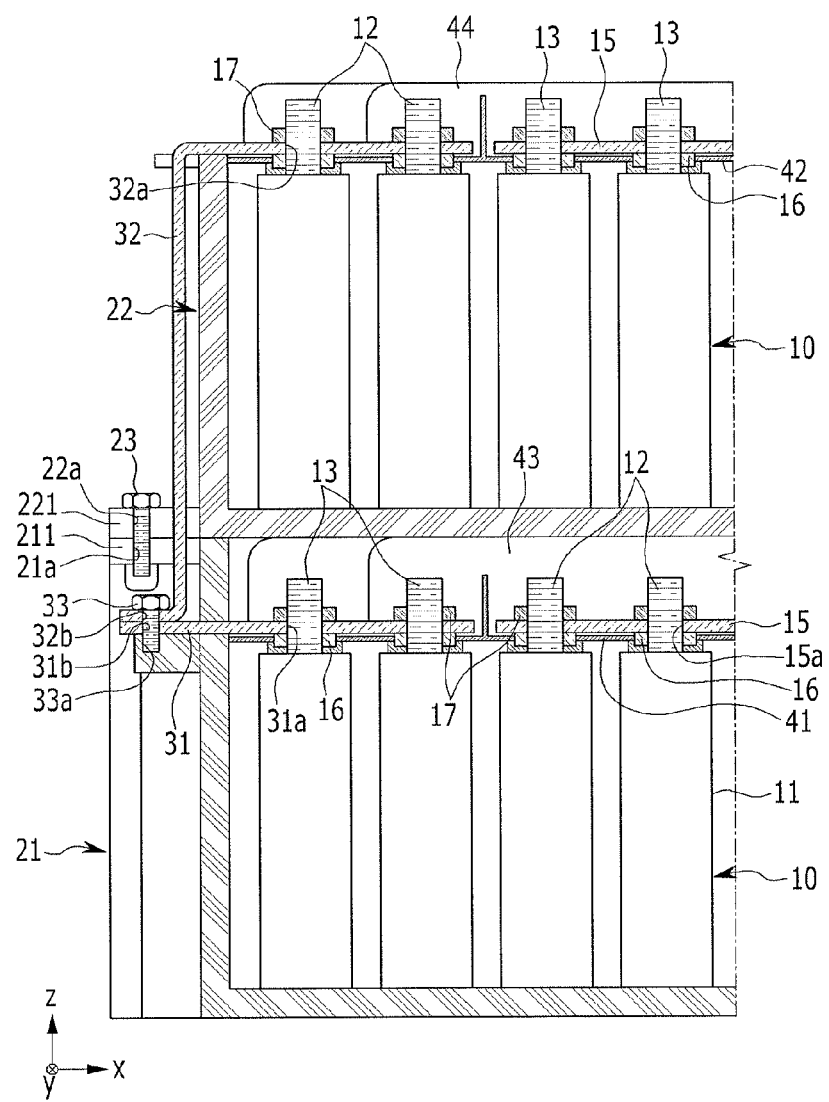
FIG. 3 illustrates a cross-sectional view taken along the line of the battery module illustrated in FIG. 1.

FIG. 3 illustrates a cross-sectional view taken along the line of the rechargeable battery illustrated in FIG. 1. With reference to the first housing 21 illustrated in FIG. 2 and FIG. 3, the bus bar 15 may include a hole 15a into which the positive or negative terminals 12 and 13 are inserted to electrically connect the positive and negative terminals 12 and 13 to each other. A base member 16 may be clamped to the positive and negative terminals 12 and 13, and the bus bar 15 may be installed on the base member 16. Nuts 17 may be respectively threaded onto the positive and negative terminals 12 and 13 to facilitate fastening the bus bar 15 to the positive and negative terminals 12 and 13. For example, a lower surface of the bus bar 15 may contact the base member 16 and an upper surface of the bus bar 15 may contact the nuts 17, such that desired parallel and series connections of the positive and negative terminals 12 and 13 may be realized.

The number of holes 15*a* formed in the bus bar 15 may be double the number of rechargeable batteries 10 coupled in parallel. As shown in FIG. 1 and FIG. 2, when two rechargeable batteries 10 are coupled in parallel and four rechargeable batteries 10 are coupled in series, the bus bar 15 may include four holes 15*a*. Although not shown, when the rechargeable batteries are coupled in series, the bus bar may include two holes. When three rechargeable batteries are coupled in parallel and six rechargeable batteries are coupled in series, the bus bar may include six holes.

Again, referring to FIG. 1, a pair of positive terminals 12 and a pair of negative terminals 13 positioned at opposing end portions of the second housing 22 may not be connected by the bus bar 15. Also, a pair of positive terminals 12 and a pair of negative terminals 13 positioned at opposing end portions of the first housing 21 may not be connected by the bus bar (not shown).

Referring to FIG. 3, a pair of negative terminals 13 may be positioned at a first end portion of the first housing 21 and may be aligned in a z-axis direction with respect to a pair of positive terminals 12 positioned at a corresponding end portion of the second housing 22. The second housing 22 may be stacked on the first housing 21. The pair of negative terminals 13, positioned at the first end portion of the first housing 21 and the pair of positive terminals 12, positioned at the corresponding end portion of the second housing 22, may not be connected by the bus bar 15, but may be electrically connected to each other by the first and second connecting members 31 and 32. For example, the first connecting member 31 may be connected to the pair of negative terminals 13 of the rechargeable battery 10 retained in the first housing 21, and the second connecting member 32 may be connected to the pair of positive terminals 12 of the rechargeable battery 10 retained in the second housing 22. The first and second connecting members 31 and 32 may be electrically connected to each other. Thus, the rechargeable batteries 10 of the first housing 21 and the second housing 22 may be coupled in series, thereby, forming the battery module 100. In an implementation, a pair of negative terminals (not shown) positioned at a second end portion (opposing the first end portion) of the first housing 21 and a pair of positive terminals positioned at a corresponding end portion of the second housing 22 may be used as terminals for outputting final power in the battery module 100.

Further, in the first exemplary embodiment, the battery modules 100 may be coupled in series by stacking two layers or rows of rechargeable batteries 10 on top of one another in each of the first and second housings 21 and 22. However, if desired, the battery modules that are coupled in parallel or in series may include more layers or stacks of rechargeable batteries 10 (not shown).

The first connecting member 31 may have a pair of first terminal connection holes 31*a* into which the negative terminals 13 of the first housing 21 may be inserted. For example, the first connecting member 31 may be installed on the base member 16 that is clamped to a pair of negative terminals 13 of the first housing 21. The nuts 17 may be threaded onto the negative terminals 13 to fasten the first connecting member 31. The first connecting member 31 may include a first protruded portion that extends away from, e.g., is not in alignment with, the first housing 21, and a first connection hole 31*b* may be formed at the first protruded portion.

The second connecting member 32 may have a pair of second terminal connection holes 32*a* into which the positive terminals 12 of the rechargeable batteries 10 retained in the second housing 22 are inserted. For example, the second connecting members 32 may be installed on the base member 16 that is clamped to a pair of positive terminals 12 of rechargeable batteries 10 retained in the second housing 22. The nuts 17 may be threaded onto the positive terminals 12 to fasten the second connecting members 32. The second connecting member 32 may include a second protruded portion that extends away from, e.g., is not in alignment with, the second housing 22, and a second connection hole 32*b* may be formed at the second protruded portion.

The second connecting member 32 may be connected to the positive terminals 12 of the rechargeable batteries 10 retained in the second housing 22. The second connecting member 32 may be bent along the outer surface of the second housing 22, e.g., at a corner of the second housing 22, and may be connected to the first connecting member 31. For example, the first and second connection holes 31*b* and 32*b* may correspond to each other, e.g., may be aligned, in one line direction (the z-axis direction) to facilitate penetration therethrough by a fastening member 33, such that the first and second connecting members 31 and 32 may be electrically connected.

The first housing 21 may have a clamping hole 33*a* defined therein corresponding to, e.g., aligned with, the first and second connection holes 31*b* and 32*b* in the one line direction (the z-axis direction). The fastening member 33 connecting the first and second connection holes 31*b* and 32*b* may penetrate the first and second connection holes 31*b* and 32*b* and may be clamped within the clamping hole 33*a*. As such, the first and second connecting members 31 and 32 may contact each other to form an electrical connection and the first and second connecting members 31 and 32 may be stably fastened.

Further, referring to FIG. 1 to FIG. 3, protection plates 41 and 42 may be an approximately square plate and may be respectively coupled to openings of the first and second housings 21 and 22 retaining the rechargeable batteries 10. The protection plates 41 and 42 may be fastened to the first and second housings 21 and 22 by a fastening member (not shown). For example, the protection plates 41 and 42 may be made of an electrical insulating material and may be partially disposed under the bus bar 15, and have protrusions 43 and 44 that protrude higher than ends of the positive and negative terminals 12 and 13 extending above the bus bar 15 and the vent plate 14. The protrusion 44 of the protection plate 41 coupled with the first housing 21 may support the lower surface of the second housing 22. The protrusion 44 may help prevent the positive and negative terminals 12 and 13 of the rechargeable battery 10 that is retained by the first housing 21 from contacting the second housing 22, and may, thereby, facilitate stabilizing the electrical structure.

As shown in FIG. 1 to FIG. 3, the first and second housings 21 and 22, respectively, may include a retaining space or cavity to receive the rechargeable batteries 10 that are connected in parallel and in series by the bus bar 15, and are stacked and interconnected in the z-axis direction.

The first housing 21 and the second housing 22, respectively, may include a first horizontal flange 211 and a second horizontal flange 221 at one side (in the x-axis direction), and may be stacked on top of each other. The first and second horizontal flanges 211 and 221 may extend in a direction, e.g., the x-axis direction, perpendicular to the stacking direction, e.g., the z-axis direction, of the first and second housings 21 and 22 and face each other in the z-axis direction, thereby stably supporting the first and second housings 21 and 22 in the stacked state.

The first and second horizontal flanges 211 and 221, respectively, may include a clamping hole 21a and a through-hole 22a, which may be clamped together, e.g., joined, by a fastening member 23 that is inserted in the stacking direction (the z-axis direction), and penetrates the through-hole 22a, and is clamped, e.g., retained, within the clamping hole 21a. For example, the fastening member 23 and the clamping hole 21a may be coupled by the screw thread. Accordingly, in the stacked state, first and second housings 21 and 22 may be prevented from moving in the x-axis and the z-axis directions.

Figure 4:
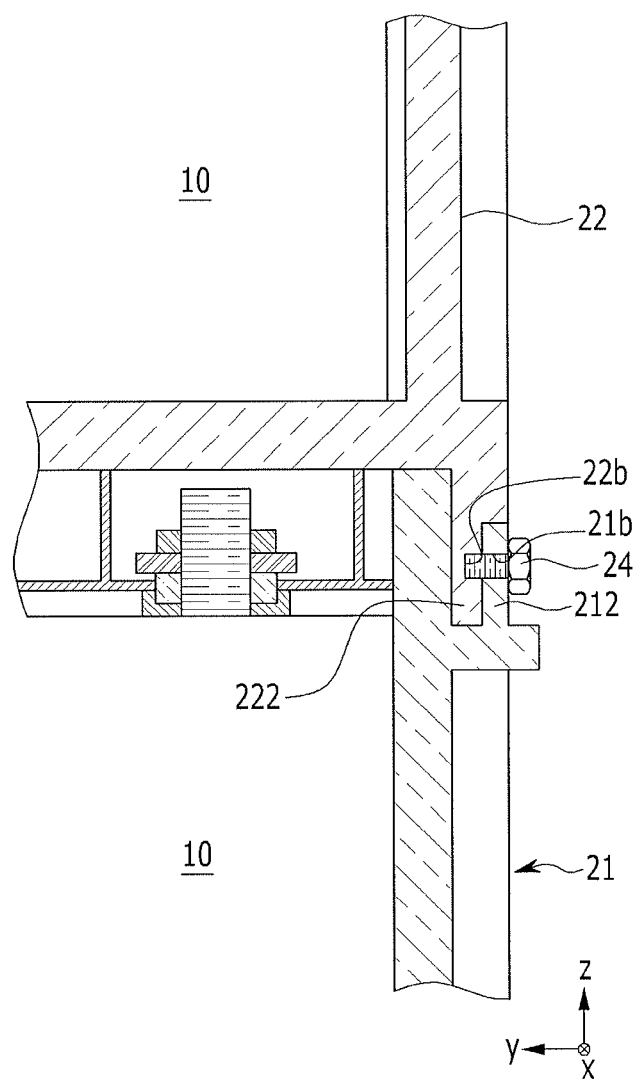
FIG. 4 illustrates a cross-sectional view taken along the line IV-IV of the battery module illustrated in FIG. 1.

FIG. 4 illustrates a cross-sectional view taken along the line IV-IV of the rechargeable battery module illustrated in FIG. 1. Referring to FIG. 1, FIG. 2 and FIG. 4, the first housing 21 may have a first vertical flange 212 protruding from one side, and the second housing 22 may have a second vertical flange 222 protruding from one side. The first vertical flange 212 and the second vertical flange 222 may extend from corresponding positions of the first housing and the second housing 22, respectively, and may be joined when first housing 21 and the second housing 22 are stacked. The first and second vertical flanges 212 and 222 may be aligned in the stacking direction (the z-axis direction) of the first and second housings 21 and 22 and face each other in the direction (the y-axis direction) perpendicular to the stacking direction. For example, the second vertical flange 222 may include a groove to receive the first vertical flange 221 and the first vertical flange 221 may include a groove to receive the second vertical flange 222. Coupling of the second vertical flange 222 and the first vertical flange 221 may further support the first and second housings 21 and 22 in the stacked state.

The first and second vertical flanges 212 and 222 may include a through-hole 21b and a clamping hole 22b, which may be clamped together or joined by a fastening member 24 that is inserted in the direction (the y-axis direction) perpendicular to the stacking direction. The fastening member 24 may penetrate the through-hole 21b, and may be clamped to, e.g., retained within, the clamping hole 22b. For example, the fastening member 24 and the clamping hole 22b may be coupled by the screw thread. Accordingly, in the stacked state, the first and second housings 21 and 22 may be prevented from moving in the y-axis and z-axis directions.

Next, the second exemplary embodiment will be described. A description of parts and components of the second exemplary embodiment that are the same as those of the first exemplary embodiment is omitted, and differences are described.

Figure 5:
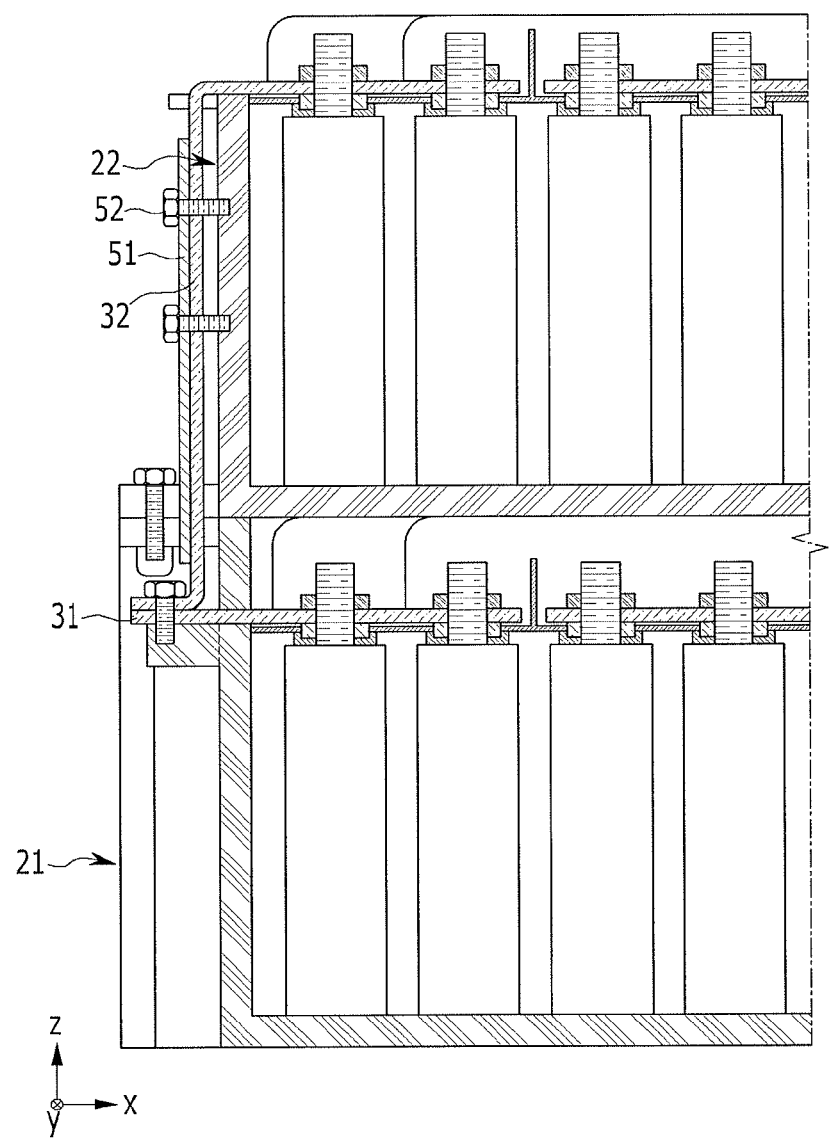
FIG. 5 illustrates a cross-sectional view of a battery module according to a second exemplary embodiment.
Figure 6:
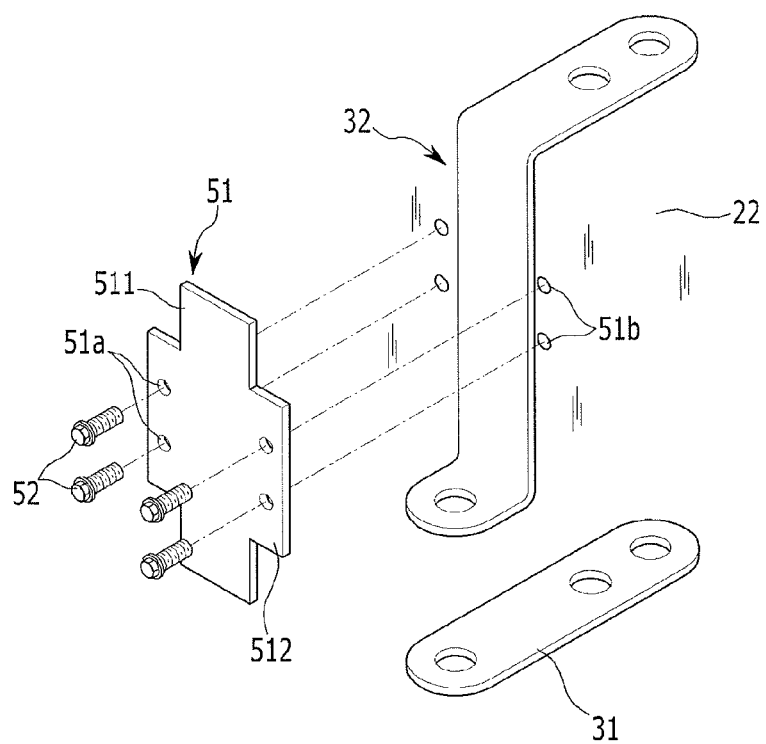
FIG. 6 illustrates an exploded perspective view of a connecting member and a fixing member of the battery module illustrated in FIG. 5.

FIG. 5 illustrates a cross-sectional view of a battery module 200 according to the second exemplary embodiment. FIG. 6 illustrates an exploded perspective view of a connecting member and a fixing member applied to FIG. 5.

In the battery module 100 of the first exemplary embodiment, the first connecting member 31 may be connected to a pair of negative terminals 13 of the rechargeable batteries 10 in the first housing 21, and the second connecting member 31 may be connected to a pair of positive terminals 12 of the rechargeable batteries 10 in the second housing 22. As such, the first and second connecting members 31 and 32 may be electrically connected to each other.

The battery module 200 of the second exemplary embodiment may further include a protection member 51. The protection member 51 may be electrically insulated and may be provided at one side of the second connecting member 32. The protection member 51 may cover the second connecting member 32 to protect against an electrical short. In the second exemplary embodiment, the protection member 51 may cover the second connecting member 32 and the first connecting member (not shown).

In an implementation, the protection member 51 may have a covering portion 511 and a mounting portion 512. The covering portion 511 may include an area corresponding to the position of second connecting member 32, to cover the second connecting member 32. The mounting portion 512 may protrude from opposing sides of the covering portion 511, and may include a through-hole 51a. A fastening member 52 may be inserted into the through-hole 51a and clamped to, e.g. retained within, a clamping hole 51b in the second housing 22, thereby stably covering the second connection member 32. For example, the fastening member 52 and the clamping hole 51b may be screw-coupled.

Accordingly, one or more embodiments may provide an arrangement of rechargeable batteries that may be effectively used in an area that is limited in the plane direction.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a first housing and a second housing, the first housing and the second housing each retaining a plurality of rechargeable batteries electrically connected to each other, the second housing being stacked on the first housing, and at least one of the rechargeable batteries retained by the second housing being electrically coupled with at least one of the rechargeable batteries retained by the first housing; and
   a connecting member electrically connecting electrode terminals of the at least one rechargeable battery retained by the first housing and the at least one rechargeable battery retained by the second housing, wherein:
   the at least one rechargeable battery retained by the first housing is positioned at an end portion of the first housing and includes a first terminal,
   the at least one rechargeable battery retained by the second housing is positioned at an end portion of the second housing, corresponds to the position of the at least one rechargeable battery retained by the first housing, and includes a second terminal,
   the connecting member includes a first connecting member extending outside of the first housing and a second connecting member connected to the first connecting member, the second connecting member extending along an end portion of the second housing in a direction in which the first housing and the second housing are stacked,
   the first connecting member is connected to the first terminal and the second connecting member is connected to the second terminal,
   the first connecting member includes a first protruded portion extending away from the first housing, the first protruded portion including a first connection hole,
   the second connecting member includes a second protruded portion extending away from the second housing, the second protruded portion including a second connection hole, lateral edges of the first connecting member are aligned in parallel with one another and with lateral edges of the second connecting member, and the first connecting member and the second connecting member are coupled together by a fastening member, an outermost end of the first protruded portion is aligned with an outermost end of the second protruded portion such that the outermost ends of the first protruded portion and the second protruded portion are a same distance from a lateral side of the first housing, the first housing has a clamping hole formed therein, the clamping hole of the first housing being vertically aligned with the first connection hole and the second connection hole, and the fastening member penetrates the first connection hole and the second connection hole and is retained within the clamping hole.

2. The battery module as claimed in claim 1, wherein:

a position of the second electrode terminal corresponds to a position of first electrode terminal, and the connecting member extends in a direction in which the first housing and the second housing are stacked along an end portion of the second housing.

3. The battery module as claimed in claim 1, wherein:

the first connecting member has a first terminal connection hole, and the first electrode terminal extends through the first terminal connection hole and is electrically connected to the first connecting member by a nut threaded thereon.

4. The battery module as claimed in claim 1, wherein:

the second connecting member has a second terminal connection hole, and the second electrode terminal extends through the second terminal connection hole and is electrically connected to the second connecting member by a nut threaded thereon.

5. The battery module as claimed in claim 1, wherein the first connecting member has a pair of first terminal connection holes corresponding to a pair of first electrode terminals.

6. The battery module as claimed in claim 1, wherein the second connecting member has a pair of second terminal connection holes corresponding to a pair of second electrode terminals.

7. The battery module as claimed in claim 1, wherein the first housing and the second housing respectively have a first horizontal flange and a second horizontal flange extending from adjacent sides of the first housing and the second housing in a direction perpendicular to a direction in which the first housing and the second housing are stacked, the first horizontal flange and the second horizontal flange facing each other.

8. The battery module as claimed in claim 7, wherein the first horizontal flange and the second horizontal flange are secured together by a fastening member, the fastening member extending in the direction in which the first housing and the second housing are stacked.

9. The battery module as claimed in claim 1, wherein the first housing and the second housing respectively have a first vertical flange and a second vertical flange, the first vertical flange and the second vertical flange extending from adjacent sides of the first housing and the second housing in a direction in which the first housing and the second housing are stacked, and the first vertical flange and the second vertical flange facing each other.

10. The battery module as claimed in claim 9, wherein the first vertical flange and the second vertical flange are secured together by a fastening member, the fastening member inserted in a direction perpendicular to the direction in which the first housing and the second housing are stacked.

11. The battery module as claimed in claim 1, further comprising:

a bus bar connecting the electrode terminals of neighboring rechargeable batteries, and a protection plate under the bus bar, the protection plate having a protrusion extending above an end portion of the electrode terminals above the bus bar.

12. The battery module as claimed in claim 11, wherein the protection plate is coupled with the first housing and supports a lower surface of the second housing.

13. The battery module as claimed in claim 1, further comprising an electrically insulating protection member at one side of the connecting member, the protection member covering the connecting member.

14. The battery module as claimed in claim 13, wherein the protection member includes:

a covering portion corresponding to a position of the connecting member, and a mounting portion protruded from both sides of the covering portion and mounted to the second housing by a fastening member.

* * * * *